United States Patent
Shibata

Patent Number: 5,896,203
Date of Patent: Apr. 20, 1999

[54] IMAGE INFORMATION COMMUNICATION APPARATUS FOR CONCURRENTLY STORING AND TRANSMITTING IMAGE INFORMATION

[75] Inventor: Hiroshi Shibata, Isehara, Japan

[73] Assignee: Ricoh Company, Ltd., Tokyo, Japan

[21] Appl. No.: 08/627,050

[22] Filed: Apr. 3, 1996

[30] Foreign Application Priority Data

Apr. 7, 1995 [JP] Japan ................. 7-107131
Jan. 31, 1996 [JP] Japan ................. 8-035797

[51] Int. Cl.$^6$ ............................. H04N 1/00
[52] U.S. Cl. ............................. 358/404; 358/405
[58] Field of Search ................. 358/400–405, 358/432–433; 379/96–100

[56] References Cited

U.S. PATENT DOCUMENTS 5,095,445  3/1992  Sekiguchi ................. 358/405

Primary Examiner—Edward L. Coles, Sr.
Assistant Examiner—Stephen Brinich
Attorney, Agent, or Firm—Oblon, Spivak, McClelland, Maier & Neustadt, P.C.

[57] ABSTRACT

In a facsimile apparatus, transmission image data is stored in an image memory after being produced by encoding and compressing raw image data. A storing operation of the transmission image data and a transmitting operation for transmitting the transmission image data are performed at the same time. A receiving operation is prohibited when the transmitting operation is being performed and the transmitting operation is prohibited when the receiving operation is being performed. Thus, the transmitting operation and the receiving operation are not interrupted due to an insufficient memory capacity of the image memory. Additionally, the transmission image data is transmitted by each set of block data when the operation of the image information communication apparatus is switched to the G3 facsimile communication mode. The transmission image data is transmitted by each set of single-page image data when the operation is switched to the G4 facsimile communication mode. Thus, an appropriate transmitting operation can be performed when the transmission image data is to be decoded and expanded to the raw image data.

14 Claims, 15 Drawing Sheets

FIG. 4A

| PARALLEL STORING AND TRANSMITTING OPERATION START DETERMINATION VALUE |
|---|
| PAGE INTERVAL STORAGE START DETERMINATION VALUE |

FIG. 4B

| FIFO AREA |
|---|
| COMMUNICATION DATA AREA |
| IMAGE CONVERSION AREA |

| FILE NUMBER |
| --- |
| DATE/TIME |
| ADDRESS INFORMATION |
| TRANSMISSION MODE |
| COMMUNICATION RESULT |
| FIRST PAGE MANAGEMENT INFORMATION ID |

| ID |
| --- |
| STORAGE MODE FLAG |
| BLOCK MAP DATA |
| NEXT PAGE MANAGEMENT INFORMATION ID |

IMAGE INFORMATION COMMUNICATION APPARATUS FOR CONCURRENTLY STORING AND TRANSMITTING IMAGE INFORMATION

BACKGROUND OF THE INVENTION

1. Field of the Invention

The present invention generally relates to an image information communication apparatus and, more particularly, to an image information communication apparatus such as a facsimile apparatus which can store image information in a memory in a compressed state and transmit the image information, wherein the storing operation and the transmitting operation can be performed substantially at the same times.

2. Description of the Related Art

When a user attempts to send a plurality of document pages by a facsimile apparatus, the user cannot take the whole document until the transmission of all the document pages is completed. Thus, the user must wait for the completion of transmission while staying nearby the facsimile apparatus.

In order to eliminate such an inconvenience, a facsimile apparatus having a so-called memory transmission function has been used. In this facsimile apparatus, image information corresponding to a plurality of pages of the document to be transmitted via the facsimile apparatus are temporarily stored in a memory. After the image information is stored, the facsimile apparatus calls a remote terminal designated by the user so as to send the image information stored in the memory thereto.

By using the memory transmission function, the user can have the document in his/her hand immediately after the document is read by the facsimile apparatus. Thus, the user no longer has to wait for the completion of the transmission since the subsequent operation can be performed automatically by the facsimile apparatus. This greatly reduces a waiting time of the user, and the operation of the facsimile apparatus is remarkably improved.

In the memory transmission function, the reading and storing operation of the document and the transmitting operation are sequentially performed as shown by a flowchart of FIG. 1. In this method, a time period spent on a single job performed by the facsimile apparatus is a sum of the time periods of a storing operation and a transmitting operation.

The storing operation includes a process for reading an original document by a scanner, a process for encoding and compressing the image data supplied by the scanner and a process for storing the encoded and compressed image data in a memory. The transmitting operation includes a process for calling a remote terminal to perform a predetermined communication protocol and a process for reading the image data in the memory and transmitting the image data to the remote terminal.

Since the storing operation and transmitting operation are almost independent of each other, the storing operation and the transmitting operation may be concurrently performed as shown by a flowchart of FIG. 2. Hereinafter, this operation is referred to as a parallel storing and transmitting operation. Apparently, this operation reduces a time period for a single job performed by the facsimile apparatus by a time period during which the storing operation and the transmitting operation are concurrently performed.

That is, in the parallel storing and transmitting operation, a time period from when the sender side starts to store image data to a time when the receiver side outputs the received image data is reduced. Thus, a time period spent on a single facsimile communication job can be reduced.

As mentioned above, the parallel storing and transmitting operation has an advantage of remarkably reducing the time period spent on sending image data by a facsimile apparatus. However, if the parallel storing and transmitting operation is applied to a facsimile apparatus having a multi-communication function in which a transmitting operation and a receiving operation are concurrently performed, there may be a problem as described below.

That is, in such a condition, if the receiving operation is set in a memory receiving mode, an available area of the memory is increased by deleting a part of image data stored in the memory immediately after the part of the image data is transmitted. This operation is performed for acquiring an area of the memory in which area the following image data to be transmitted can be stored. The memory for storing the image data to be transmitted is also used as a memory for storing the received image data As the image data received from a remote terminal is accumulated in the memory, an available memory area is reduced. This may result in a situation where the parallel storing and transmitting operation cannot be smoothly operated due to an insufficient memory area.

Additionally, in a group 4 facsimile apparatus using ISDN, which has a high transmission speed, as a transmission line, a time period spent on the encoding and compressing operation may become a bottleneck for reducing the storing operation of the image data read by a scanner. This is because a reading speed of the scanner has been increased. If the reading speed of the scanner is faster than the storing operation of the image data read by the scanner, the reading operation of the scanner must be intermittently performed. This operation mode is referred to as an intermittent reading mode. If the scanner is operated in the intermittent reading mode, a continuous reading operation cannot be performed. Thus, there is a possibility that the image data has noise due to frequent stopping of the reading operation. This results in deterioration in a quality of an image output at the receiver side.

In order to eliminate such a problem, it is suggested to provide a buffer memory in which the image data supplied by the scanner is temporarily stored. The stored image data is then processed by the encoding and compressing operation. However, even if the buffer memory is used, there is a possibility that the supply of the encoded and compressed image data is not sufficient for the speed of the transmitting operation especially when the image data corresponds to a photographic image which requires a relatively long time for encoding and compression. When such a condition occurs, raw image data which is not encoded and compressed is supplied to the memory.

In the G3 facsimile communication mode, the image data stored in the memory is always decoded to the raw image data to be stored in a line memory before it is transmitted. The raw image data in the line memory is once again compressed by, for example, a Modified Modified Read (MMR) method. This operation is performed for a part of image data corresponding to each page or each block smaller than a single page. Thus, if the raw image data is mixed with the compressed image data in the memory, there is no problem for the G3 facsimile communication mode. However, in a G4 facsimile communication mode, the image data in the memory is transmitted without being processed by the decoding and encoding operations as is done in the G3 facsimile communication mode. Thus, when the G4 facsimile communication mode is used, it should be determined whether or not the raw image data is mixed with the image data in the memory which is to be transmitted so that the image data will be encoded and compressed again when the image data contains the raw image data.

In a conventional G4 facsimile communication mode, information representing the nature of the image data, which information includes the presence of the raw image data, is added to a part of the image data corresponding to each pages Accordingly, when the G4 facsimile communication mode is used, and if the image data is transmitted by each block, which is smaller than a single page, there is a problem in that it is difficult to recognize whether or not a part of the image data to be transmitted contains the raw data.

SUMMARY OF THE INVENTION

It is a general object of the present invention to provide an improved and useful image information communication apparatus in which the above-mentioned problems are eliminated.

A more specific object of the present invention is to provide an image information communication apparatus which can perform a transmitting operation and a receiving operation in a manner such that an available memory capacity of an image memory is not influenced, when one of the transmitting operation and the receiving operation is performed, by the other one of the transmitting operation and the receiving operation even when the image memory is shared for the transmitting operation and the receiving operation.

Another object of the present invention is to provide an image information communication apparatus in which an appropriate transmitting operation can be performed when the image data stored in the image memory contains raw image data.

In order to achieve the above-mentioned objects, there is provided according to one aspect of the present invention an image information communication apparatus for communicating with a plurality of remote image information communication apparatuses via a communication network, the image information communication apparatus comprising:

image storing means for storing transmission image data in an image memory, the transmission image data being produced by encoding and compressing raw image data obtained by reading an original document of which image data is to be transmitted to one of the remote image information communication apparatuses;

parallel storing and transmitting means for concurrently performing a storing operation of the transmission image data and a transmitting operation for transmitting the transmission image data stored in the image memory; and control means for controlling the transmitting operation of the parallel storing and transmitting means and a receiving operation for receiving image data from one of the remote image information communication apparatuses and for storing the received image data in the image memory so that the receiving operation is prohibited when the transmitting operation is being performed and the transmitting operation is prohibited when the receiving operation is being performed.

According to the above-mentioned invention, even though the image memory is shared for the transmitting operation and the receiving operation, the transmitting operation and the receiving operation are not performed at the same time. That is, the image memory is exclusively used for one of the transmitting operation and the receiving operation. Thus, an available memory capacity remaining in the image memory, when one of the transmitting operation and the receiving operation is performed, is not influenced by the other one of the transmitting operation and the receiving operation. Thus, the transmitting operation and the receiving operation are not interrupted due to an insufficient memory, capacity of the image memory which condition may occur when the transmitting operation and the receiving operation are performed at the same time.

Additionally, there is provided according to another aspect of the present invention an image information communication apparatus for communicating with a plurality of remote image information communication apparatuses via a communication network, the image information communication apparatus being operated in either one of a G4 facsimile communication mode and a G3 facsimile communication mode, the image information communication apparatus comprising:

switch means for switching an operation of the image information communication apparatus to one of the G4 facsimile communication mode and the G3 facsimile communication mode;

image storing means for storing transmission image data in an image memory, the transmission image data being produced by encoding and compressing raw image data obtained by reading an original document of which image data is to be transmitted to one of the remote image information communication apparatuses, the transmission image data being stored by each set of single-page image data corresponding to a single page of the original document, each set of single-page image data being divided into a plurality of sets of block data;

first transmitting means for transmitting the transmission image data by each of the sets of block data when the operation of the image information communication apparatus is switched to the G3 facsimile communication mode; and second transmitting means for transmitting the transmission image data by each set of the single-page image data only when the operation of the image data communication apparatus is switched to the G4 facsimile communication mode.

According to this invention, when the image information communication apparatus such as a facsimile apparatus is operated in the G3 facsimile communication mode, the image data is transmitted for each set of block data. On the other hand, when the facsimile apparatus is operated in the G4 facsimile communication mode, the image data is transmitted for each set of page data. In the MMR method which is adopted for the G4 facsimile communication mode, information representing the nature of the transmission image data stored in the image memory is provided not for each set of block data but for each set of page data. Thus, in this invention, when the facsimile apparatus uses the G4 facsimile communication mode, the image data is transmitted for each set of page data so that the transmission image data is decoded and expanded if, for example, the raw image data is contained in the transmission image data.

Accordingly, in one embodiment of the present invention, the second transmitting means may comprise determining means for determining whether or not the transmission image data is to be decoded and expanded to the raw image data so as to change the transmission image data in the image memory before transmitting the transmission image data to one of the remote image information communication apparatuses.

The determining means may determine that the transmission image data is to be encoded and expanded when the transmission image data contains the raw image data.

Additionally, the determining means may determine that the transmission image data is to be decoded and expanded when an encoding and compressing mode of the image information communication apparatus is different from an encoding and compressing mode of one of the remote image information communication apparatuses being connected.

Further, the determining means may determine that the transmission image data is to be decoded and expanded when a first image size of the image information communication apparatus is different from a second image size of one of the remote image information communication apparatuses being connected.

Further, the determining means may determine that the transmission image data is to be decoded and expanded when a first resolution of the image information communication apparatus is different from a second resolution of one of the remote image information communication apparatuses being connected. The determining means may determine that the transmission image data is to be decoded and expanded when the first resolution and the second resolution are different in a line density. The determining means may determine that the transmission image data is to be decoded and expanded when the first resolution and the second resolution are different in a length unit.

Additionally, the determining means may determine that the transmission image data is to be decoded and expanded when additional information is to be added to the transmission image data before the transmission image data is transmitted. The additional information may be transmitter terminal identification information, or a calling number of one of the remote image information communication apparatuses being connected.

In the image information communication apparatus according to the present invention, the second transmitting means may comprise a decoding and expanding unit for decoding and expanding the transmission image data to the raw image data when the determining means determines that the transmission image data is to be encoded and compressed, the second transmitting means further comprising an encoding and compressing unit for encoding and compressing the raw image data produced by the decoding and expanding unit after a change is made to the raw image data produced by the decoding and expanding unit.

Additionally, the image information communication apparatus according to the present invention may further comprise:

parallel storing and transmitting means for concurrently performing a storing operation of the transmission image data and a transmitting operation for transmitting the transmission image data stored in the image memory; and control means for controlling the transmitting operation of the parallel storing and transmitting means and a receiving operation for receiving image data from one of the remote image information communication apparatuses so that the receiving operation is prohibited when the transmitting operation is being performed and the transmitting operation is prohibited when the receiving operation is being performed.

Other objects, features and advantages of the present invention will become more apparent from the following detailed description when read in conjunction with the accompanying drawings.

BRIEF DESCRIPTION OF THE DRAWINGS

FIG. 4A is an illustration for explaining a structure of a parameter memory shown in FIG. 3;

FIG. 4B is an illustration for explaining a structure of an image processing memory shown in FIG. 3;

DETAILED DESCRIPTION OF THE PREFERRED EMBODIMENTS

Figure 3:
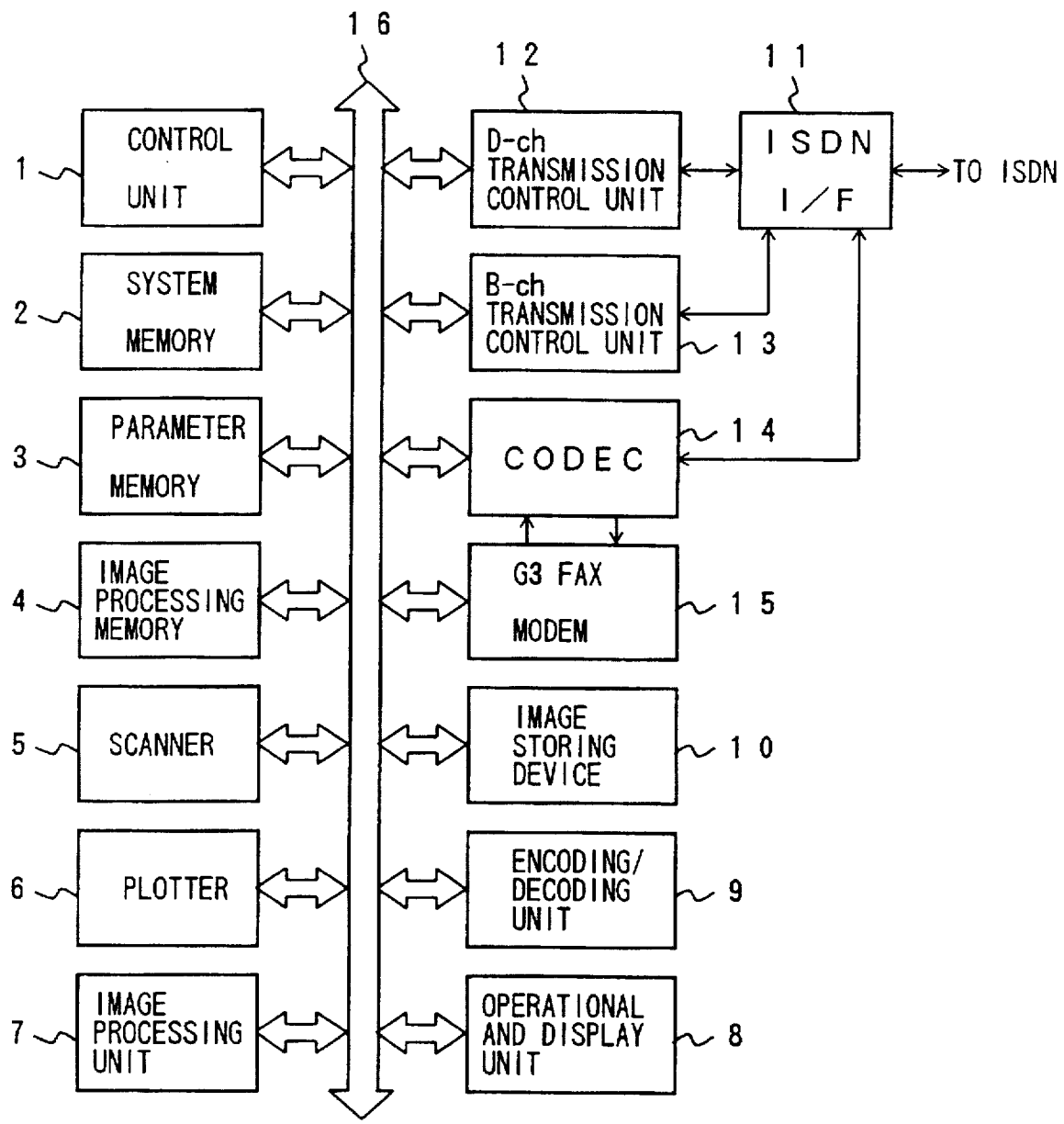
FIG. 3 is a block diagram of a facsimile apparatus according to a first embodiment of the present invention.

A description will now be given, with reference to FIG. 3 of a first embodiment of the present invention. FIG. 3 is a block diagram of a facsimile apparatus according to the first embodiment of the present invention. The facsimile apparatus shown in FIG. 3 uses the ISDN as a communication line. The facsimile apparatus can be operated either in the G3 facsimile communication mode or the G4 facsimile communication mode. Additionally the facsimile apparatus has a multi-communication function and a parallel storing and transmitting function.

As shown in FIG. 3, the facsimile apparatus according to the first embodiment of the present invention comprises a control unit 1, a system memory 2, a parameter memory 3, an image processing memory 4, a scanner 5, a plotter 6, an image processing unit 7, an operational and display unit 8, an encoding/decoding unit 9, an image storing device 10, an ISDN interface 11, a D-channel transmission control unit 12, a B-channel transmission control unit 13, a CODEC 14 and a G3 FAX modem 15.

The control unit 1 controls an entire operation of the facsimile apparatus including various controlling operations such as a communication line setting operation according to the G3 facsimile communication protocol and the G4 facsimile communication protocol. The system memory 2 stores process programs executed by the control unit 1 and various sets of data necessary for executing the process programs. The system memory also provides a work area for the control unit 1.

The parameter memory 3 comprises a rewritable non-volatile semiconductor memory such as a battery backed up SRAM, for storing various sets of information specific to the facsimile apparatus. The image processing memory 4 comprises a memory area for processing information to be transmitted and information that was received, a memory area used when image information is transmitted, and a memory area for an image data conversion process. The scanner 5 reads an original document image according to a resolution set in the G4 facsimile communication mode. The plotter 6 outputs an image according to the resolution set in the G4 facsimile communication mode.

The image processing unit 7 performs various processes such as a pixel density conversion process and a multiplication changing process for image data. The operational and display unit 8 is provided for a user to input various commands and displays various information on a screen such as an LCD.

The encoding/decoding unit 9 encodes and compresses the image data to be transmitted, and decodes and expands the encoded and compressed image data to the original image data. The image storing device 10 stores image data including the image data to be transmitted.

The ISDN interface 11 connects to the ISDN, and has a function to integrate/separate the signals on the D-channel (signal channel) and the B-channel (information channel). The D-channel transmission control unit 12 performs a transmission control process such as a calling control process by using the ISDN D-channel. The B-channel transmission control unit 13 performs transmission control processes for layers 2, 3 and 4 in the G4 facsimile communication control process using the ISDN B-channel.

The CODEC 14 performs a conversion from an analog signal to a digital signal so as to transmit the analog signal via the B-channel of the ISDN. The G3 FAX modem 15 is used to realize the G3 facsimile communication. The G3 FAX modem 15 has a low-speed modem function such as a V.21 modem function and a high-speed modem function such as a V.17 modem function, a V.33 modem function, a V.29 modem function or a V.27ter modem function for transmitting mainly image information.

The control unit 1, the system memory 2, the parameter memory 3, the image processing memory 4, the scanner 5, the plotter 6, the image processing unit 7, the operational and display unit 8, the encoding/decoding unit 9, the image storing device 10, the D-channel transmission control unit 12, the B-channel transmission control unit 13, the CODEC 14 and the G3 FAX modem 15 are interconnected by a bus 16. Thus, information can be transmitted among these parts via the bus 16. Additionally, the CODEC 14 can directly communicate with the G3 FAX modem 15.

The facsimile apparatus shown in FIG. 3 reads, when image data is to be transmitted, the original document image set in the scanner 5. The image data obtained by the scanner 5 is encoded and compressed by the encoding/decoding unit 9. The encoded and compressed image data is then stored in the image storing device 10 At the same time, the facsimile apparatus calls a remote terminal (facsimile apparatus) according to a number designated by a user, and performs a predetermined procedure in accordance with a communication protocol so as to set various communication conditions for transmitting the image data. A transmitting operation of the image data already stored in the image storing device 10 is started while image data to be transmitted is being stored That is the facsimile apparatus shown in FIG. 3 has a function to perform the parallel storing and transmitting operation.

It should be noted that when an encoding mode used for the image data stored in the image storing device 10 is different from an encoding mode to be used for image data which can be received by the remote terminal the image data stored in the image storing device 10 is decoded to the original image data by the encoding/decoding unit 9. The decoded image data is then encoded and compressed in accordance with the encoding mode acceptable by the remote terminal. The reencoded image data is then transmitted to the remote terminal. In order to perform such operations at the same time, the encoding/decoding unit 9 may comprise two processors which can be independently operated. Or, the encoding/decoding unit 9 may have a capability to perform an encoding operation and a decoding operation at the same time.

If the resolution of the image data obtained by the scanner 5 is different from the resolution used in the remote terminal, the image data stored in the image storing device 10 is decoded to the original image data by the encoding/decoding unit 9. The resolution of the original image data is converted into the resolution which is acceptable to the remote terminal by the image processing unit 7. The image data is encoded and compressed again according to the encoding mode acceptable to the remote terminal. The image data is then transmitted to the remote terminal.

The parameter memory 3 stores, as shown in FIG. 4A, a parallel storing and transmitting operation start determination value and a page interval storage start determination value. The parallel storing and transmitting operation start determination value represents a condition for starting an operation according to the parallel storing and transmitting function.

The parallel storing and transmitting operation start determination value is set and stored by the user, for example, operating the operational and display unit 8. For example, one of the values, 256 KB, 512 KB and 768 KB is selected and set by the user. The value 512 KB may be set as a default value to be automatically selected when no value is selected by the user. The page interval storage start determination value is used as a reference value for calculating a condition to start a reading operation for a next page when image data corresponding to a plurality of pages is transmitted and when the image data is transmitted according to the parallel storing and transmitting function. A value set by the user or a value stored in the facsimile apparatus is used as the page interval storage start determination value.

The image processing memory 4 comprises, as shown in FIG. 4B, a first-in first-out memory (FIFO) area, a communication data area and an image conversion area. The FIFO area is used as a buffer memory for temporarily storing the image data supplied by the scanner 5. The communication data area is used for temporarily storing the image data to be transmitted and image data that has been received. The image conversion area is used by the image processing unit 7 when performing a converting operation of image data. The FIFO area may be provided as a separate unit or may be defined by software.

Figure 5:
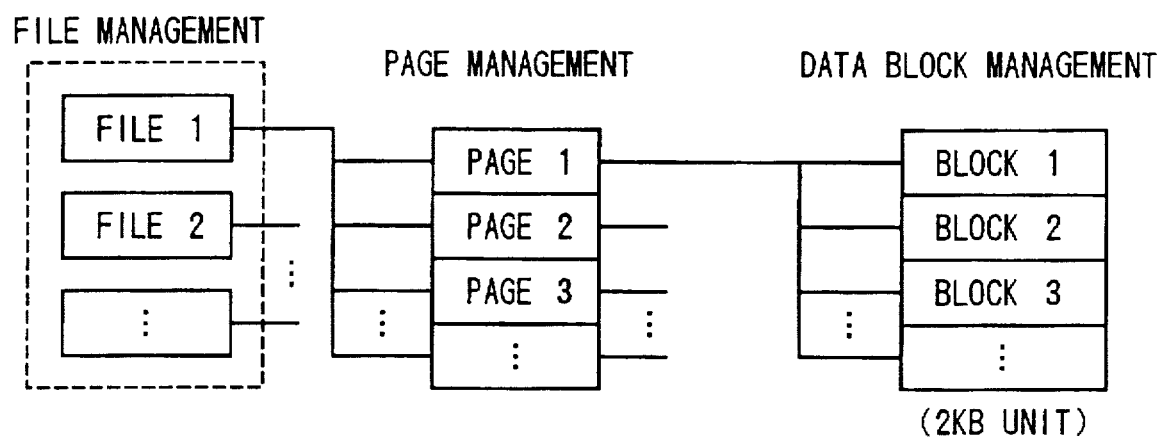
FIG. 5 is an illustration for explaining a management system for each file stored in an image storing device shown in FIG. 3.

As shown in FIG. 5, the image data stored in the image storing device 10 is managed for each file unit. Each file is managed by each page unit. Additionally, the image data corresponding to each page is managed by being divided into a plurality of data blocks. Each data block has a capacity of 2 KB (1 KB=1024 B; 1 B=1 octet=8 bits).

Basically, the image data (single page image data) corresponding to a single page obtained by the scanner 5 is stored in the image storing device 10 after the single-page image data is encoded and compressed according to the MMR method. However, the image data (raw image data) as supplied by the scanner 5 may be stored in the image storing device 10 when a speed of encoding and compressing the raw image data cannot be as fast as a speed of a scanning operation performed by the scanner 5.

Figures 6, 7A, 7B:
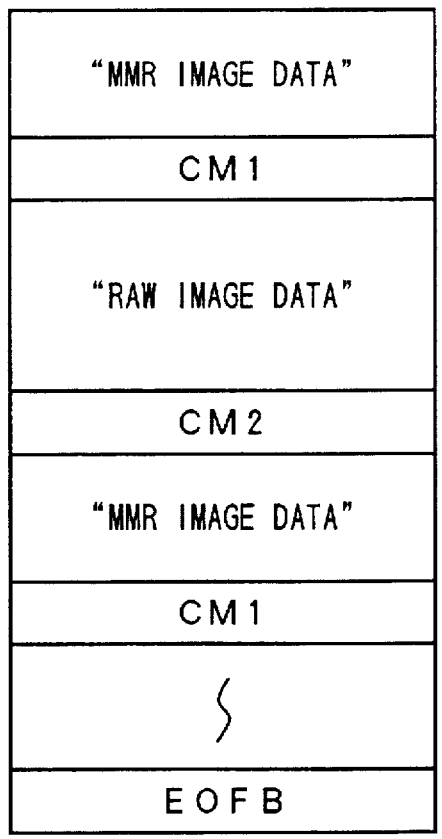
FIG. 6 is an illustration for explaining a state of image data stored in the image storing device.
FIG. 7A is an illustration for explaining a structure of file management information for managing the image data stored in the image storing device.
FIG. 7B is an illustration of a structure of page management information for managing a state of storage of the image data corresponding to each page.

FIG. 6 illustrates a state of the image data stored in the image storing device 10. The single page image data stored in the image storing device 10 starts from a data part (MMR image data) which is encoded and compressed according to the MMR method. Raw image data follows the first MMR image data, and the raw image data is followed by the second MMR image data. In this manner, the single-page image data comprises the MMR image data and the raw image data which are alternatively arranged. A code EOFB representing the end of the single-page image data is provided at the end of the single-page image data. Additionally, a code CM1 is interposed at each position where the MMR image data is changed to the raw image data. A code CM2 is interposed at each position where the raw image data is changed to the MMR image data. The code CM1 and the code CM2 are bit patterns which are not included in the MMR image data, and comprise the same number of bits.

FIG. 7A illustrates a structure of file management information for managing the image data stored in the image storing device 10. The file management information includes a file number, data and time information for storing the image data, address information, transmission mode information, communication result information and a first-page management information ID. Each file can be identified by the file name. The address information represents ID information such as a dial number of the remote terminal to be reached. The first page management information represents a state of storage of the image data corresponding to the first page.

FIG. 7B illustrates a structure of page management information for managing a state of storage of the image data corresponding to each page. The page management information includes ID information a storage mode flag, block map data and a next-page management information ID. The ID information is provided for identifying each page management information. The storage mode flag represents whether the single-page image data contains only MMR image data or both the MMR image data and the raw image data. The block map data represents a state of a bit map of the data block which stores a part of the single-page image data The next page management information ID is provided for identifying the next-page management information.

Figure 8:
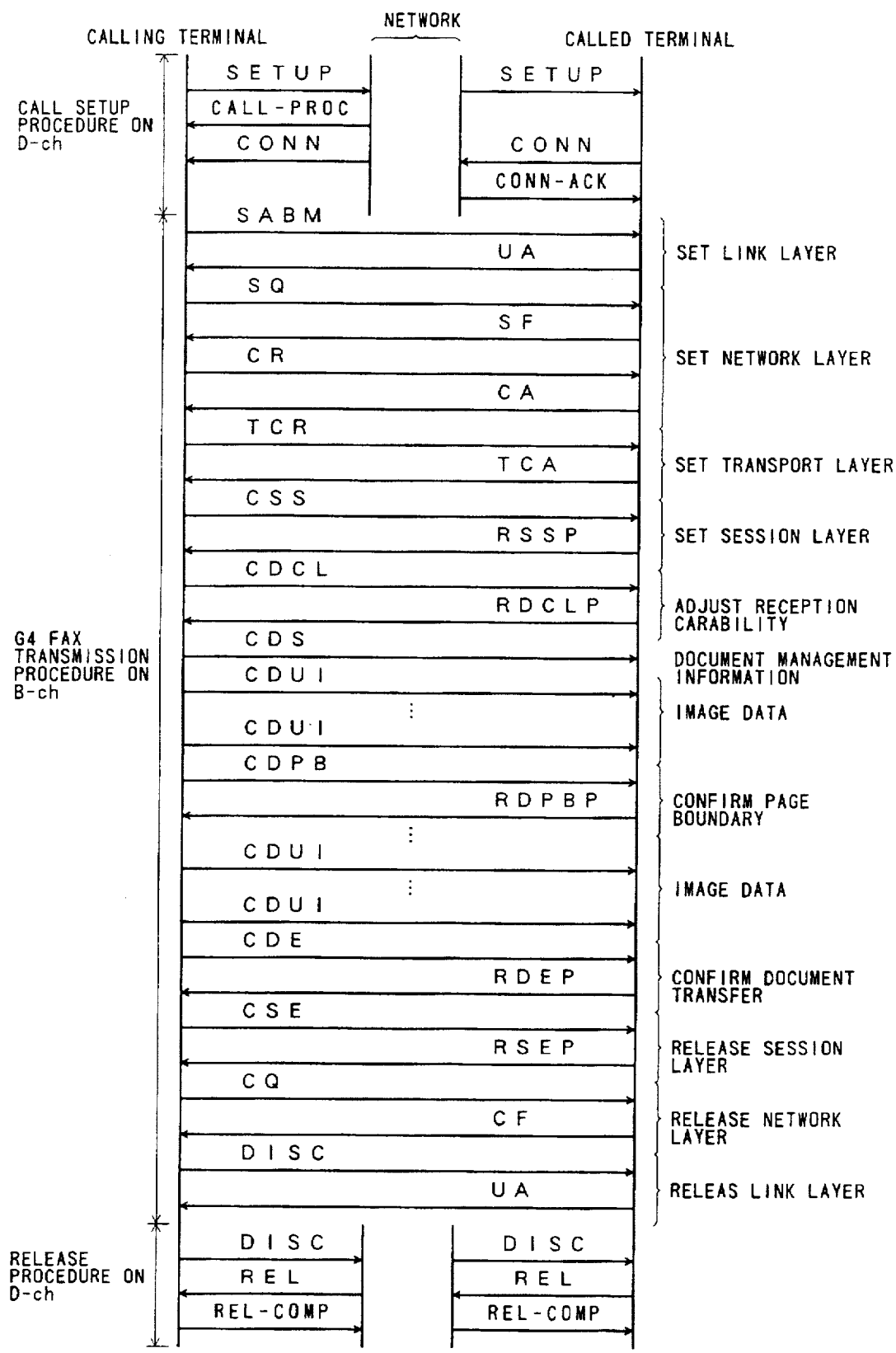
FIG. 8 is an illustration for explaining a procedure for setting a communication line according to the G4 facsimile communication mode.

FIG. 8 is an illustration for explaining a procedure for setting a communication line between two facsimile apparatuses according to the G4 facsimile communication mode.

One (calling terminal) of the facsimile apparatuses (G4 facsimile apparatus) first sends a call setup message SETUP to the ISDN to request a call set-up with the other one (called terminal) of the facsimile apparatuses. The ISDN sends back a call set-up reception message CALL-PROC to the calling terminal so as to notify the calling terminal of the state of the call set-up. At the same time, the ISDN calls the called terminal by sending the call set-up message SETUP to the called terminal which is designated by the calling terminal.

The called terminal sends the response message CONN to the ISDN when the message SETUP is received. The ISDN then sends back a response acknowledgement message CONN-ACK to the called terminal so as to confirm the response of the called terminal. At this time, the B-channel is established between the calling terminal and the called terminal. Thus, the calling terminal and the called terminal start the procedure for communication through the B-channel.

The calling terminal first sends to the called terminal a command SABM so as to request a setting of a link layer. The called terminal sends back a response UA. The link layer is set by this procedure.

The calling terminal then sends a signal SQ so as to establish a network layer end-to-end. The called terminal sends a signal SF so as to accept the network layer. Then the calling terminal sends to the called terminal a signal CR so as to request a call set-up. The called terminal accepts the call set-up and sends a signal CA. Thus, the network layer is established.

In the next step, the calling terminal sends a signal TCR so as to set a transport layer. The called terminal accepts the setting and sends back a signal TCA to the calling terminal. Thus the transport layer is established.

The calling terminal then sends a session start command CSS to the called terminal so as to set a connection of a session layer. The called terminal sends back a session start acceptance response RSSP to the calling terminal so start the session layer.

The calling terminal then sends a document function list command CDCL to the called terminal so as to negotiate the transmission function to be used. The called terminal sends back a document function list acceptance response RDCLP. Thereby, adjustment of the reception capability is performed.

When the preparation for the transmission of image data is completed as mentioned above, the calling terminal sends a document start command CDS followed by the image data corresponding to a single document by a plurality of user information commands CDUI. The document start command CDS includes various sets of information for managing document information such as a document reference number for distinguishing information corresponding to a document to be transmitted. When all the image data is transmitted the calling terminal sends a document end command CDE to notify the called terminal of the end of the transmission of image data corresponding to a single document.

When the called terminal receives the document end command CDE, the called terminal sends back a document end acceptance response RDEP which represents that reception of the image data was completed in a normal condition. Additionally, if a plurality of pages are included in the document, the calling terminal sends a document page boundary command which represents the end of a single page when the image data corresponding to a single page is completed. At this time, the called terminal sends back a document page boundary acceptance response which represents that the reception of the image information for a single page was completed in a normal condition.

When the transmission of the image data corresponding to a single document is completed, the calling terminal sends a session end command CSE to the called terminal. The called terminal then sends back a session end acceptance response RSEP to release the connection of the session layer. The calling terminal then sends a signal CQ for the network layer, and the called terminal sends back a signal CF to the calling terminal so as to release the network layer. Additionally, the calling terminal sends a command DISC for the link layer, and the called terminal sends back a response UA so as to release the link layer.

When the link on the B-channel is released, the calling terminal sends a disconnection message DISC to the ISDN to request a release of the B-channel. The ISDN sends back a release message REL to the calling terminal. At the same time, the ISDN sends the disconnection message DISC to the called terminal so as to request a release of the B-channel. The called terminal then sends back the release message to the ISDN to notify of the release of the B-channel.

The calling terminal sends a release completion message REL-COMP to notify of the release of the B-channel. Thus, the B-channel between the calling terminal and the ISDN is released At the same time, the ISDN sends the release completion message REL-COMP to the called terminal. Thus the B-channel established between the ISDN and the called terminal is completely released.

The B-channel between the calling terminal and the called terminal is established in the above-mentioned manner, and then the established B-channel is released when the data transmission is completed.

Figure 9:
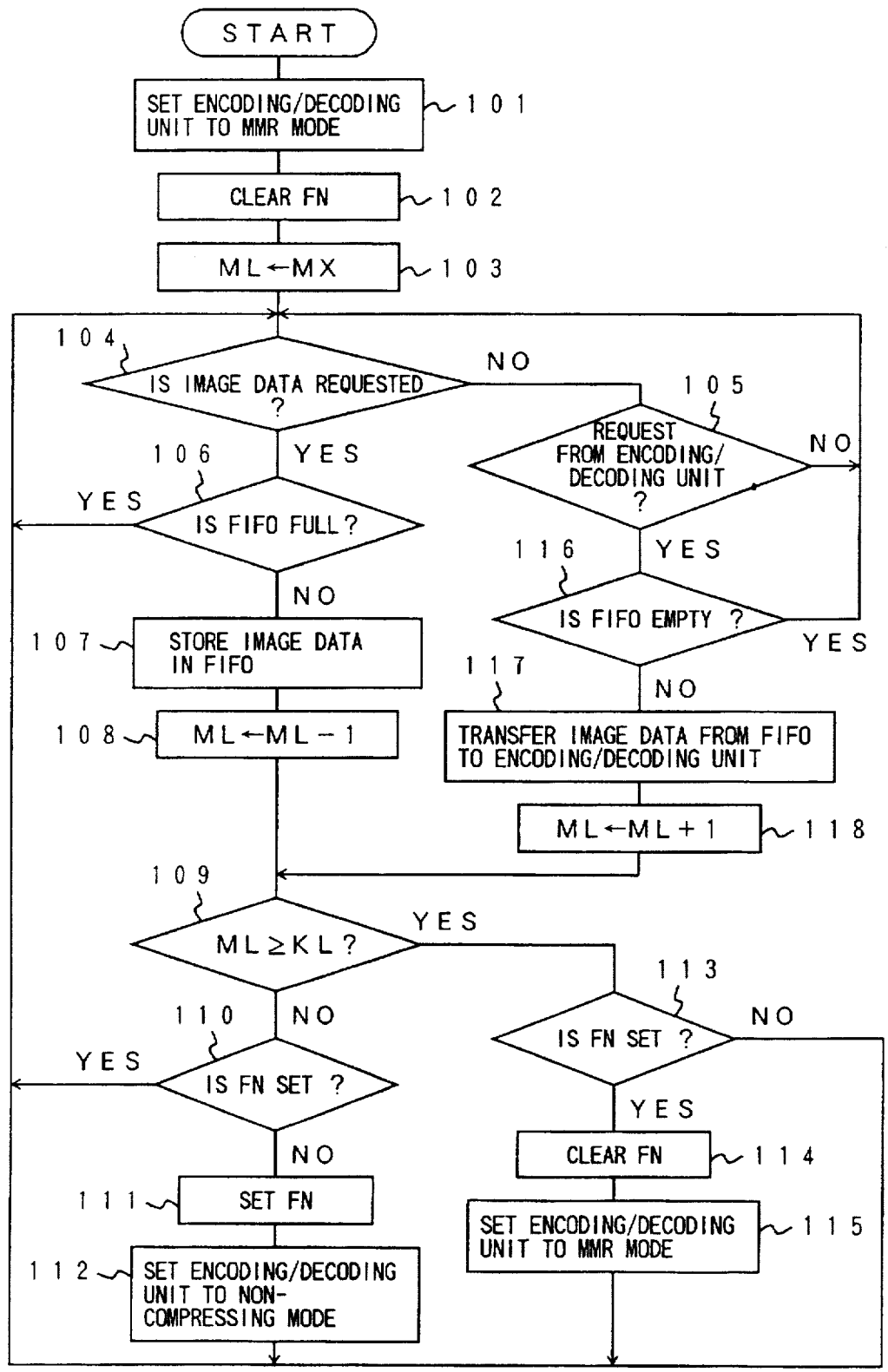
FIG. 9 is a flowchart of an operation for encoding the image data obtained by a scanner shown in FIG. 3.

FIG. 9 is a flowchart of an operation for encoding the image data obtained by the scanner 5. When the operation shown in FIG. 9 is started, the MMR mode is set, in step 101, to the encoding/decoding unit 9. A flag FN is cleared, in step 102, which flag indicates that the encoding/decoding unit 9 is set in the non-compressing mode for storing the raw image data. In step 103, a constant MX is set to a parameter ML. The constant MX represents a memory capacity of the FIFO area of the image processing memory After the system is initialized as mentioned-above, it is determined, in step 104, whether or not an input of a request for transferring image data from the scanner 5 is input. If it is determined that there is no input of the request for transferring image data from the scanner 5, the routine proceeds to step 105. In step 105, it is determined whether or not an input of a request for data has been input from the encoding/decoding unit 9. If it is determined, in step 104, that the request for transferring image data from the scanner 5 is input, the routine proceeds to step 106. In step 106, it is determined whether or not the FIFO area of the image processing memory 4 is full. If it is determined that the FIFO area is full, the routine returns to step 104 so as to wait for an empty area being produced since no image data can be stored in the FIFO area.

On the other hand, if it is determined, in step 106, that the FIFO area is not full, the routine proceeds to step 107 in which the image data corresponding to a single line is input from the scanner 5. Then, in step 108, a value of the parameter is decremented. It is then determined, in step 109, whether or not the value of the parameter ML is equal to or greater than a predetermined value KL.

If it is determined that the value of the parameter ML is equal to or greater than the predetermined value KL, the operation mode of the encoding/decoding unit 9 is set to a raw data mode since a remaining area of the FIFO area is not sufficient for storing the image data corresponding to a single line. Thus, is step 110, it is determined whether or not the flag FN is set. If it is determined that the flag FN is not set, this means that the encoding/decoding unit 9 has been operated in the MMR mode immediately before the determination in step 110. Thus, the flag FN is set in step 111, and the routine proceeds to step 112. In step 112, the non-compressing mode is set in the encoding/decoding unit 9, and then the routine returns to step 104.

If it is determined, in step 109, that the value of the parameter ML is not equal to or greater than the predetermined value KL, this means that a sufficient empty space is present in the FIFO area. Thus, the operational mode of the encoding/decoding unit 9 is set to the MMR mode. It is determined, in step 113, whether or not the flag FM is set. If it is determined that the flag FM is set, this means that the encoding/decoding unit 9 has been operated in the non-compressing mode immediately before the determination in step 113. Thus, the flag FM is cleared in step 114, and the routine proceeds to step 115. In step 115, the MMR mode is set in the encoding/decoding unit 9, and then the routine returns to step 104.

If it is determined, in step 105, that the request for an input of the data from the encoding/decoding unit 9 is made, the routine proceeds to step 116. It is determined, in step 116, whether or not the FIFO area in the processing memory unit 4 is empty. If it is determined that the FIFO area is empty, this means that no data is present to transfer to the encoding/decoding unit 9. Thus, the routine returns to step 104.

If it is determined, in step 116, that there is image data in the FIFO area, the image data in the FIFO area is transferred to the encoding/decoding unit 9 for each line in step 117. Then the value of the parameter is incremented in step 118, and the routine proceeds to step 109.

Figure 10:
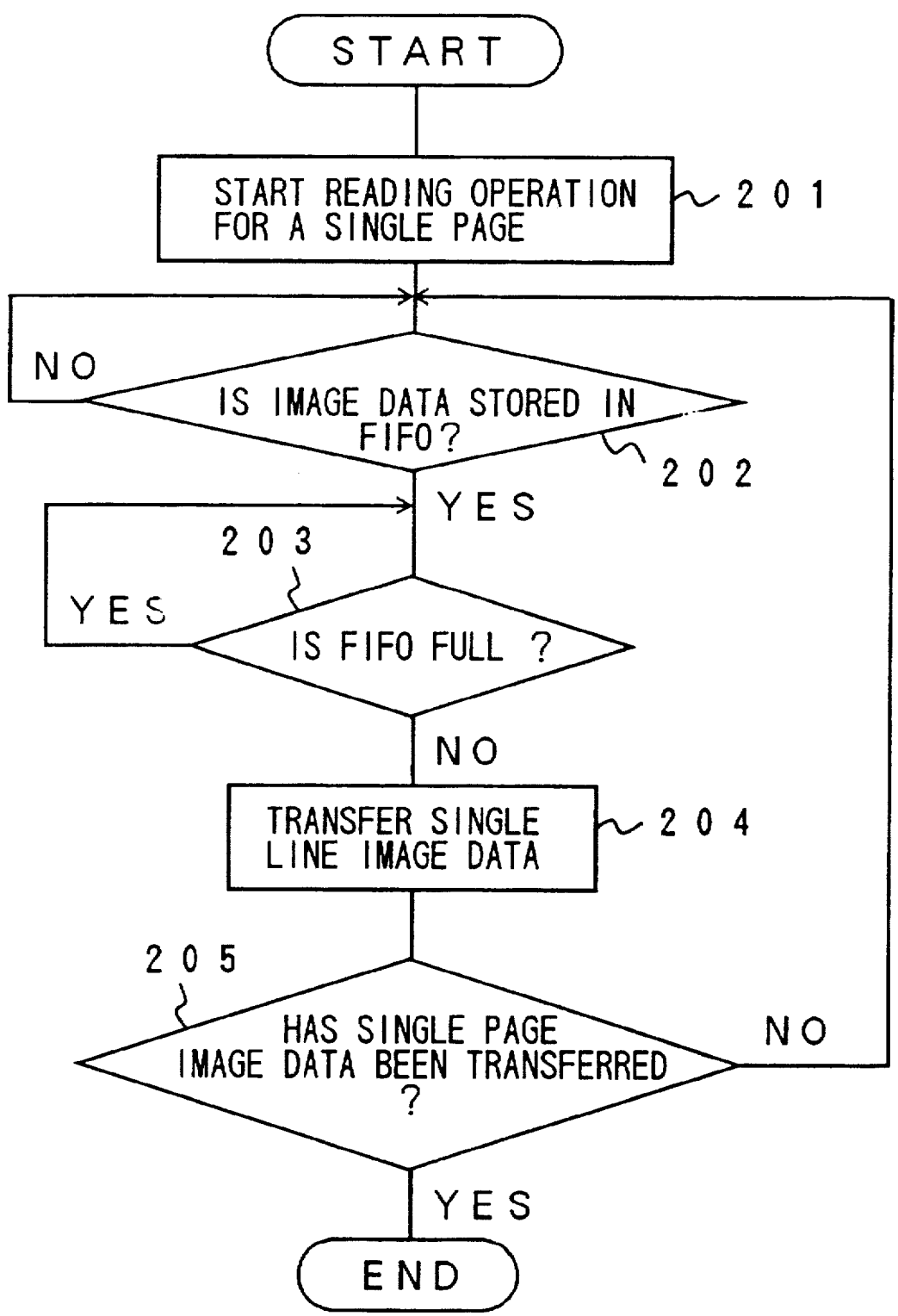
FIG. 10 is a flowchart of an operation of the scanner shown in FIG. 3.

FIG. 10 is a flowchart of an operation of the scanner 5. When the operation shown in FIG. 10 is started, an operation for reading the single-page image data is performed by the scanner 5 in step 201. Thus, the original document is fed to a scanning unit of the scanner 5 for each page. Then, the original document is read for each line, and the image data (single-line image data) corresponding to each line is stored in the FIFO area of the image processing unit 4. The original document of which reading operation is completed and is ejected after it is read.

It is then determined in step 202, whether or not the image data is stored in the FIFO area. If it is determined that the image data is stored in the FIFO area, the routine proceeds to step 203. It is determined, in step 203, whether or not the FIFO area is full. If it is determined that the FIFO area is full, this means that the image data output from the scanner 5 cannot be stored in the FIFO area of the processing memory unit 4. Thus, the system waits for an empty area to be produced in the FIFO area.

If it is determined, in step 203, that the FIFO area is not full, that is, there is an empty space for storing the single-line image data in the FIFO area, a request for the single-line image data is generated so that the single-line image data is transferred, in step 204, from an output buffer to the FIFO area. Thereafter, the single-line image data in the output buffer is deleted.

It is then determined, in step 205, whether or not a transferring operation for the single page image data has been completed. If it is determined that the single page image data has not been transferred, the routine returns to step 202. If it is determined that the single page image data has been completed, the routine is ended.

Figure 11:
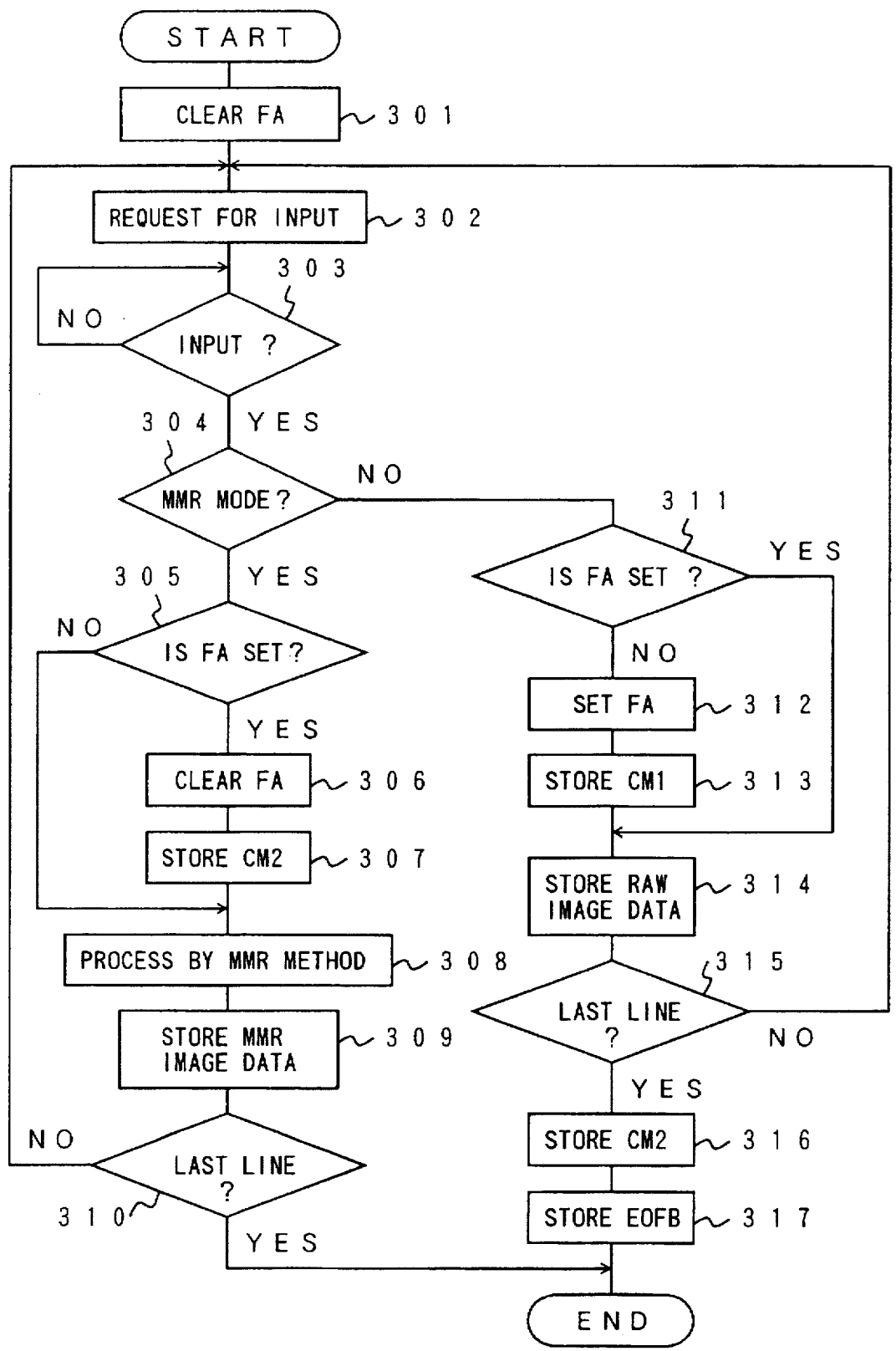
FIG. 11 is a flowchart of an operation for encoding the image data which is performed before storing the image data in the image storing device.

FIG. 11 is a flowchart of an operation for encoding the image data which is performed before storing the image data in the image storing device 10. In this case, the encoding/decoding unit 9 stores the MMR image data or the raw image data to a temporary storing buffer area formed in the communication data area of the image processing memory 4 (refer to FIG. 4B) as the image data which has been already encoded. The image data stored in the temporarily storing buffer is transferred to and stored in the image storing device 10 by a file management process.

When the operation shown in FIG. 11 is started, a flag FA, indicating that the non-compression mode is set, is cleared in step 301. At this state, a data input request is generated, and the routine waists for an input of the image data. It is then determined, in step 303, whether or not the image data is input. If it is determined that the image data is input, the routine proceeds to stop 304. In step 304, it is determined whether or not the encoding/decoding unit 9 is set in the MMR mode.

If it is determined, in step 304, that the MMR mode is set, the routine proceeds to step 305. It is then determined, in step 305, whether or not the flag FA is set. If it is determined that the flag FA is set, the routine proceeds to step 306 to clear the flag FA. Then, the code CM2 is stored in the temporary storage buffer in step 307. Then the single line image data is processed by the MM method in step 308. The MMR image data is temporarily stored in the temporary storage buffer in step 309.

Thereafter it is determined in step 310, whether or not the image data corresponding to a last line has been read. If it is determined, in step 310, that the last line has not been read, the routine returns to step 302 so as to request the image data corresponding to the next line.

If it is determined, in step 305, that the flag FA is not set, the routine proceeds to step 308. Additionally, if it is determined, in step 310, that the image data corresponding to the last line has been processed, the routine is ended.

If it is determined, in step 304, that the encoding/decoding unit 9 is not set in the MMR mode, that is, if the encoding/decoding unit 9 is set in the non-compression mode, the routine proceeds to step 311. In step 311, it is determined whether or not the flag FA is set. If it is determined that the flag FA is not set, the flag FA is set in step 312. In this case, since the operational mode of the encoding/decoding unit 9 is changed from the MMR mode to the non-compression mode, the code CM1 is stored in the temporary storage buffer in step 313. The single-line image data is then stored, in step 314, in the temporary storage buffer. After executing step 314, it is determined, in step 315, whether or not image data corresponding to the last line has been encoded. If it is determined that the image data for the last line has not been encoded, the routine returns to step 302 so as to encode the image data corresponding to the next line.

On the other hand, if it is determined in step 311, that the flag FA is set, the routine proceeds to step 314 since the operational mode of the encoding/decoding unit 9 is already set in the non-compression mode. Additionally if it is determined in step 315, that the image data corresponding to the last line has been encoded, the routine proceeds to step 316. In step 316, the code CM2 is stored in the temporary storage buffer. In step 317, the code EOFB is stored in the temporary storage buffer, and the routine is ended.

Figure 12:
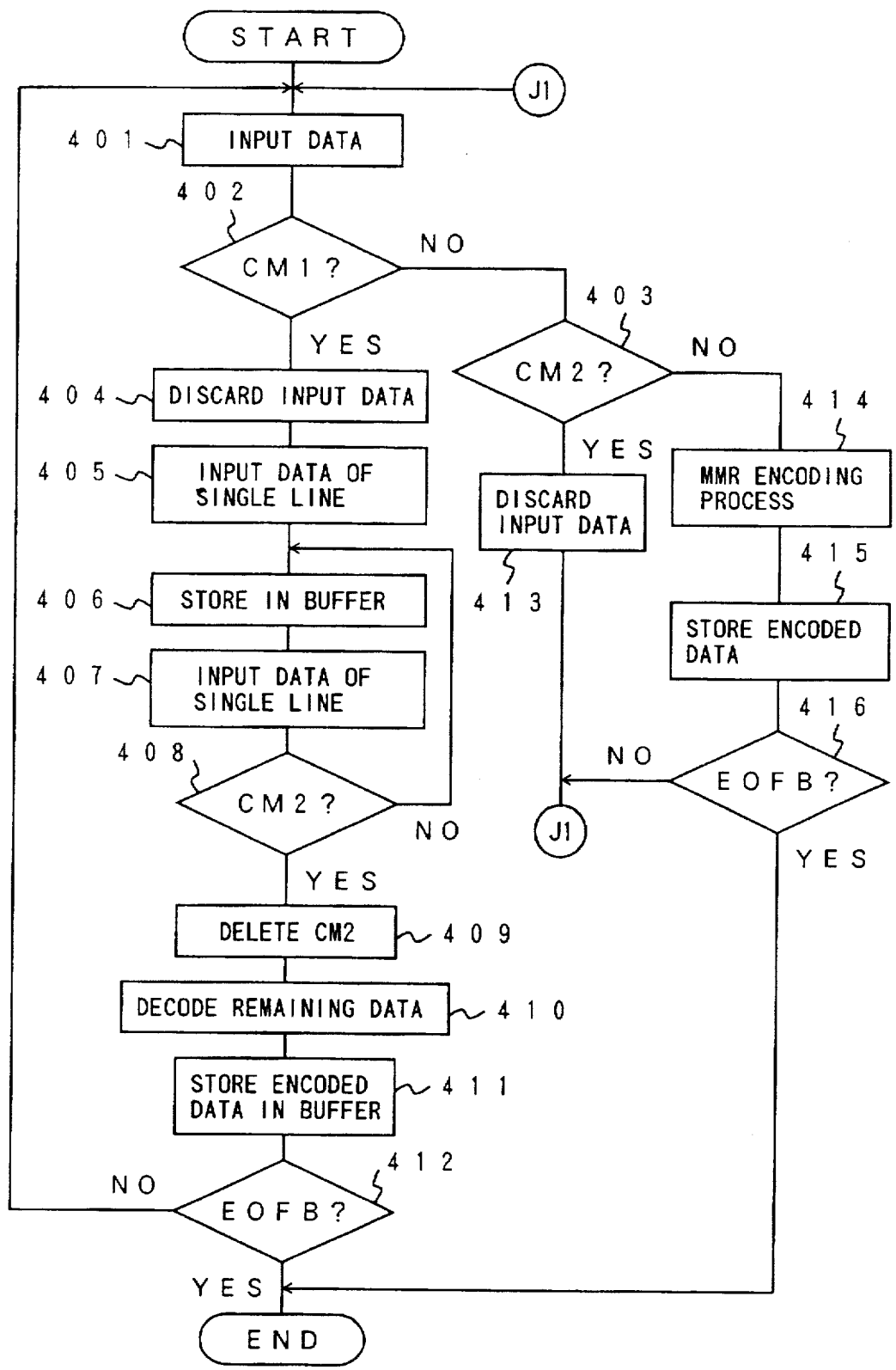
FIG. 12 is a flowchart of an operation for decoding image data stored in the image storing device to the original image data.

FIG. 12 is a flowchart of an operation performed by the encoding/decoding unit 9 for decoding the image data stored in the image storing device 10 to the original image data. In this case, the original image data obtained by encoding the image data by the encoding/decoding unit 9 is temporarily stored in a reproduction buffer of the image processing memory 4.

When the operation shown in FIG. 12 is started, data having a length corresponding to the data length of the codes CM1 and CM2 is input in step 401. It is then determined, in step 402, whether or not the input data is the code CM1. If it is determined that the input data is the code CM1, the routine proceeds to step 404. In step 404, the input data is discarded. In step 405, the raw image data corresponding to a single line is input. The raw image data is stored in the reproduction buffer in step 406. Then, the raw image data corresponding to the next line is input in step 407. It is then determined, in step 408, whether or not the code CM2 is included in the input data. If there is the code CM2, the code CM2 is found in the head of the input data. If it is determined that the code CM2 is not included, the routine returns to step 406 to store the input data in the reproduction buffer.

If it is determined that the code CM2 is included in the input data, the routine proceeds to step 409. In step 409, the code CM2 is deleted from the input data, and then the remaining data is processed by an MMR decoding process in step 410. The decoded data is stored in the reproduction buffer in step 411. It is then determined, in step 412, whether or not the code EOFB (refer to FIG. 6) is detected in the MMR decoding process. If it is determined that the code EOFB is not detected, the routine returns to step 401 so as to perform the decoding operation for the image data corresponding to the next line. If it is determined, in step 412, that the code EOFB is detected, it is determined that the encoding operation for the single-page image data is completed, and thus the routine is ended.

On the other hand, if it is determined, in step 402, that the input data input in step 401 is not the code CM1, the routine proceeds to step 403. In step 403, it is determined whether or not the input data is the code CM2. If it is determined that the input data is the code CM2, the routine proceeds to step 413. In step 413, the input data which is the code CM2 is discarded, and the routine returns to step 401 so as to continue the encoding operation for the image data in the image storing device 10.

If it is determined, in step 403, that the input data is not the code CM2, that is, if it is determined that the input data corresponds neither to the code CM1 nor the code CM2, the routine proceeds to step 414. In step 414, the input data is processed by the MMR encoding process. The encoded data is stored in the reproduction buffer in step 415. It is then determined, in step 416, whether or not the code EOFB (refer to FIG. 6) is detected in the MMR decoding process. If it is determined that the code EOFB is not detected, the routine returns to step 401 so as to perform the decoding operation for the image data corresponding to the next line. If it is determined, in step 416, that the code EOFB is detected, it is determined that the encoding operation for the single-page image data is completed, and thus the routine is ended.

When the user sets an original document including a plurality of pages on the scanner 5 and presses a start key in the operational and display unit 8 after inputting a calling number, an operation for storing the image data is started. A flowchart of this operation is shown in FIG. 13.

Figure 1:
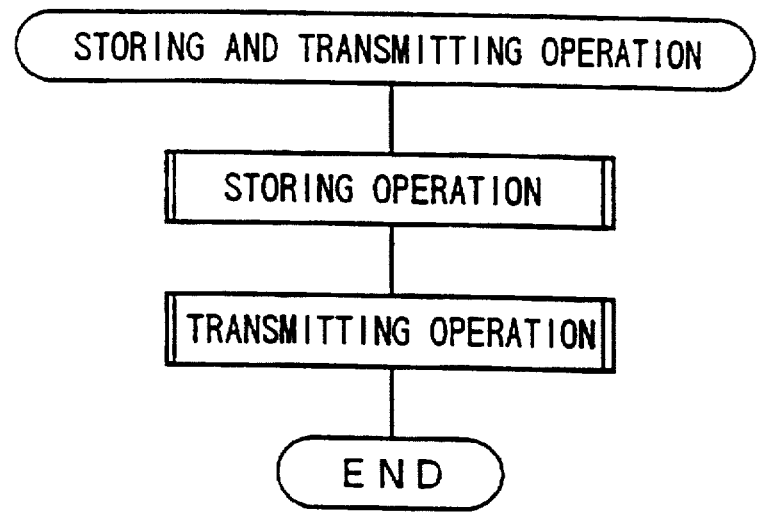
FIG. 1 is a flowchart of an operation performed by a conventional facsimile apparatus in which a transmitting operation is performed after a storing operation is completed.
Figure 2:
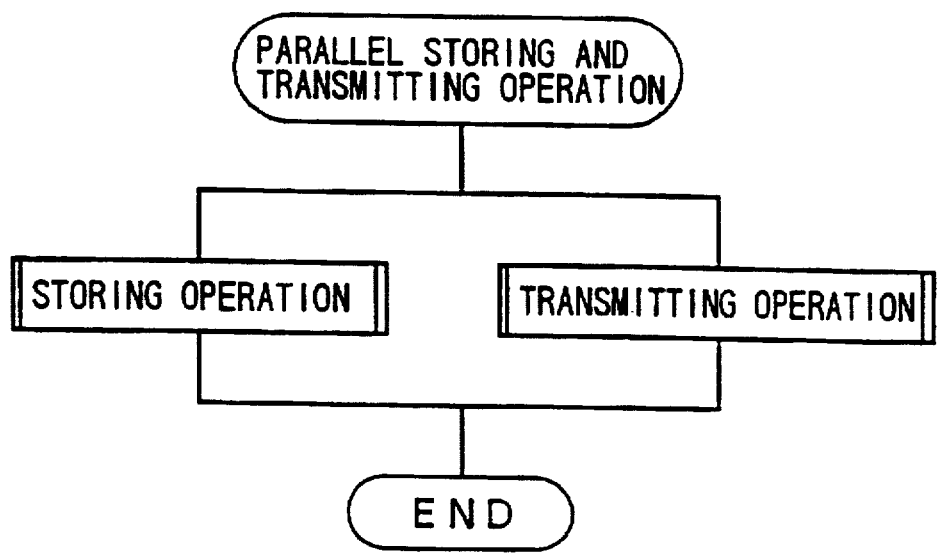
FIG. 2 is a flowchart of an operation performed by another conventional facsimile apparatus in which a storing operation and a transmitting operation are performed substantially at the same time.
Figure 13:
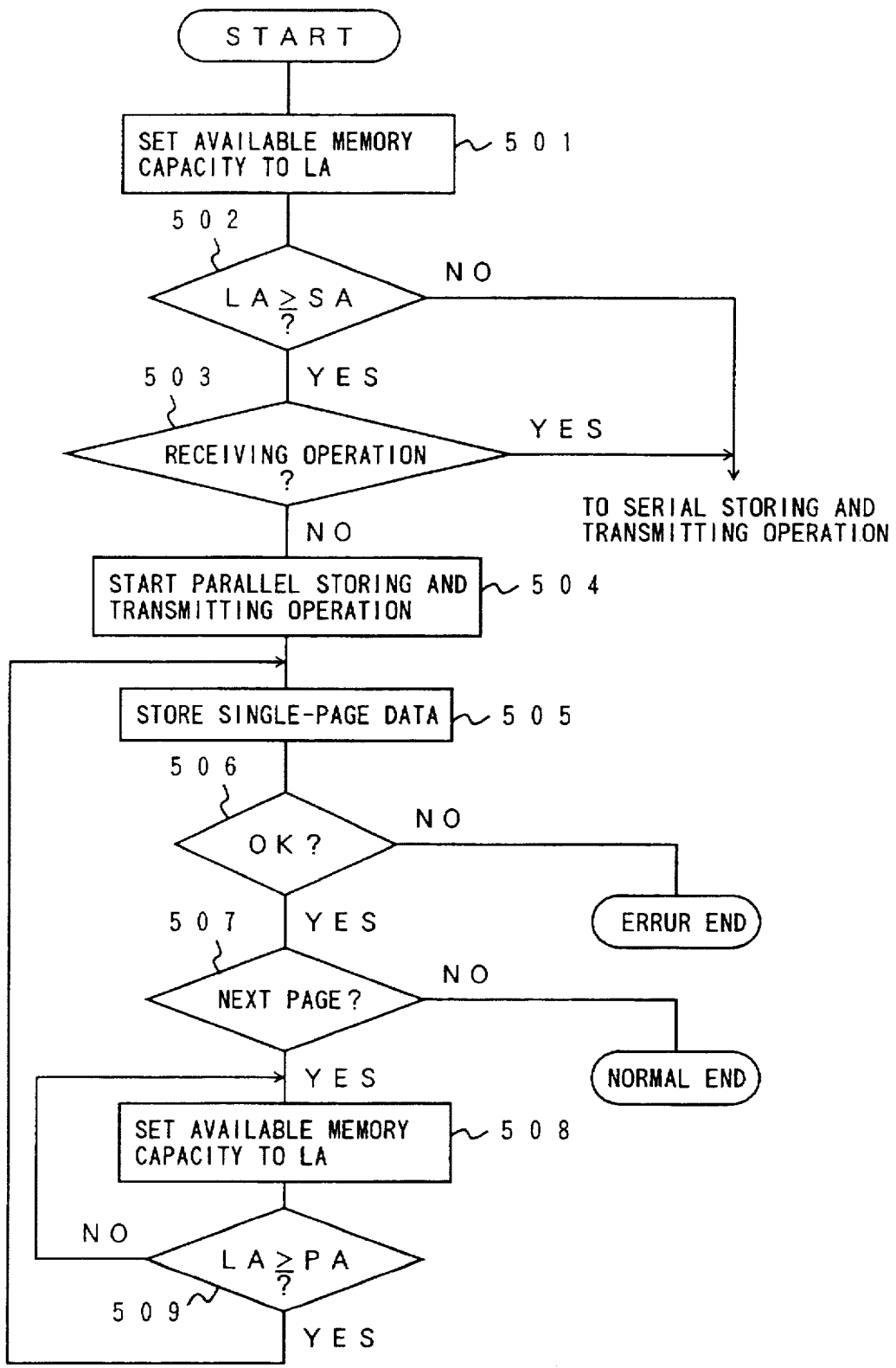
FIG. 13 is a flowchart of an operation for storing the image data.
Figure 14:
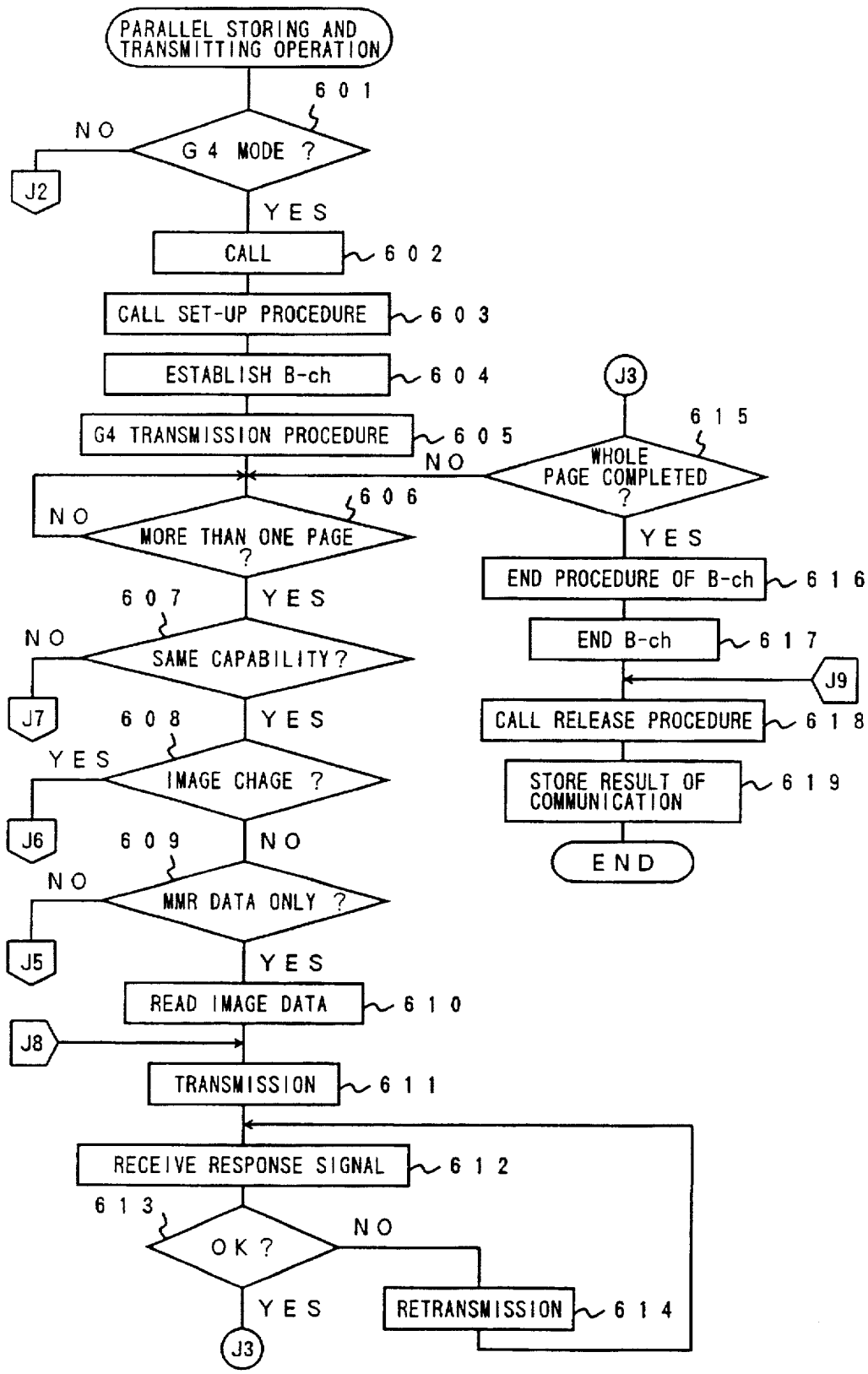
FIGS. 14, 15A–15C and 16 are parts of a flowchart of an example of a parallel storing and transmitting operation.

When the operation shown in FIG. 13 is started, an available memory capacity of the image storing device 10 is checked, and the result is set to the parameter LA in step 501. It is then determined, in step 502, whether or not the value of the parameter LA is equal to or greater than the parallel storing and transmitting operation start determination value SA (refer to FIG. 4A). If it is determined that the parameter LA is not equal to or greater that the value SA, the routine proceeds to the serial storing and transmitting operation (refer to FIG. 1) since the parallel storing and transmitting operation cannot be performed. This is because there is a possibility that the image storing device 10 may overflow due to an insufficient empty area.

If it is determined, in step 502, that the parameter LA is equal to or greater than the value SA, the routine proceeds to step 503. In step 503, it is determined whether or not a receiving operation of image data from a remote terminal is being performed. If it is determined that the receiving operation is being preformed, the routine proceeds to the serial storing and transmitting operation since there is a possibility that the parallel storing and transmitting operation cannot be properly performed.

On the other hand, if it is determined, in step 503, that the receiving operation is not being performed, the routine proceeds to step 504. In step 504, the parallel storing and transmitting operation is started for storing the image data in the image storing device 10 and concurrently transmitting the image data stored in the image storing device 10 to a remote terminal. Thus, the first page of the original document is read by the scanner 5, and the image data is encoded by the encoding/decoding unit 9. The encoded image data is stored in the image storing device 10. In this manner, the single page image data is stored in the image storing device 10 in step 505. It is then determined, in step 506, whether or not the single page image data has been properly stored in the image storing device 10.

If it is determined that the single-page image data is not properly stored, an error end process is performed for notifying the user of the error, and the routine is ended. When the error end process is performed, a guidance for notifying of the error may be displayed, or an error sound is generated. Alternatively, the operation of the scanner 5 may be stopped, or a feeding operation of the original document being read may be stopped.

On the other hand, if it is determined, in step 506, that the single page image data is properly stored in the image storing device 10, the routine proceeds to step 507. In step 507, it is determined whether or not a next page is set in the scanner 5. If it is determined that there is not a next page, the routine is ended since the storing operation for all the image data is completed.

If it is determined that a next page is present, a capacity of the empty area of the image storing device 10 is checked, and the result is set to the parameter LA in step 508. It is then determined, in step 509, whether or not the parameter LA is equal to or greater than the page interval storage start determination value PA (refer to FIG. 4A). If it is determined that the parameter LA is not equal to or greater than the value PA, the image data stored in the image storing device 10, which image data has already been transmitted to a remote terminal, is deleted from the image storing device 10, and the routine returns to step 508. The steps 508 and 509 are repeated until a sufficient empty area is obtained in the image storing device 10. If it is determined, in step 509, that the parameter LA is equal to or greater than the value PA, the routine returns to step 505 so as to continue the reading and storing operation for the next page.

FIGS. 14, 15A–15C and 16A are parts of a flowchart of an example of the parallel storing and transmitting operation.

When the parallel storing and transmitting operation is started it is determined, in step 601, whether or not the transmission mode is the G4 facsimile communication mode. If it is determined that the G4 facsimile communication mode is used, the designated terminal is called in step 602. A predetermined call procedure is performed in step 603. Thereby, the predetermined information channel (B-ch) is established in step 604. A predetermined G4 facsimile communication procedure is performed in step 605, for transmitting image data via the established channel.

It is determined, in step 606, whether or not image data corresponding to more than one page is stored in the image storing device 10. If it is determined that the image data corresponding to more than one page is not stored, step 606 is repeated until the image data corresponding to more than one page is stored.

On the other hand, if it is determined, in step 606, that the image data corresponding to more than one page is stored in the image storing device 10, the routine proceeds to step 607. In step 607, it is determined whether or not a capability for processing image data is the same as that of the remote terminal to which the image data will be transmitted. If the capability is the same as that of the remote terminal, the routine proceeds to step 608. In step 608 it is determined whether or not an image changing process is designated. If it is determined that no image changing process is designated the routine proceeds to step 609. In step 609, it is determined whether or not the image data to be transmitted is comprised of only the MMR image data which is encoded according to the MMR encoding mode by referring to the storing mode flag in the page management information. If it is determined that the image data to be transmitted is the MMR image data, the single-page image data corresponding to a single page of the original document is read out from the image storing device 10 in step 610. The single page image data is then stored in the transmission buffer in the image processing memory 4. Thereafter, in step 611, the single page image data stored in the transmission buffer is transmitted to the remote terminal.

After a response signal is received from the remote terminal in step 612, it is determined whether or not the image data is received in a normal condition. If it is determined that the image data is not received in a normal condition, the routine proceeds to step 614 so as to transmit the image data in the transmission buffer once again. Then, the routine returns to step 612 to receive a response signal from the remote terminal. If it is determined, in step 613, that the image data is received by the remote terminal in a normal condition, the routine proceeds to step 615 after discarding the image data in the transmission buffer.

In step 615, it is determined whether or not the image data corresponding to the whole page has been transmitted. If it is determined that the image data corresponding to the whole page has not been transmitted yet, the routine returns to step 606. If it is determined that the image data corresponding to the whole page has been transmitted, the routine proceeds to step 616. In step 616, a transmission end procedure of the G4 facsimile communication mode is performed. In step 617, the information channel (B-ch) is completed, and the call disconnection and release procedure is performed in step 618. The result of transmission is then stored in the file management information in step 619.

Figure 15A:
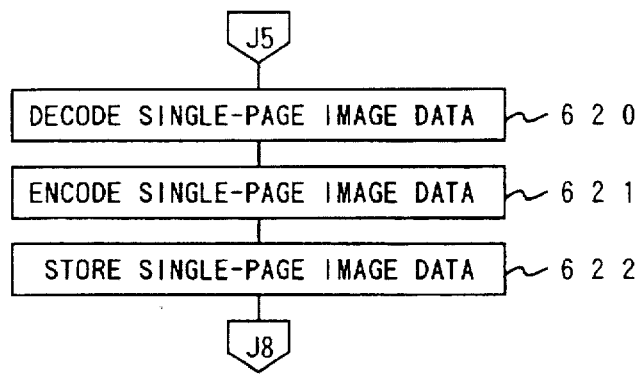

If the determination of step 609 is negative, the routine proceeds to step 620 shown in FIG. 15A. In step 620, the image data corresponding to the whole page is decoded so as to restore the raw image data, which image data contains both the raw image data and the MMR image data. The raw image data corresponding to the whole page is once again encoded by the MMR method in step 621 and then the MMR image data is stored in the communication buffer in step 622. Thereafter, the routine proceeds to step 611 so as to transmit the image data in the transmission buffer.

Figure 15B:
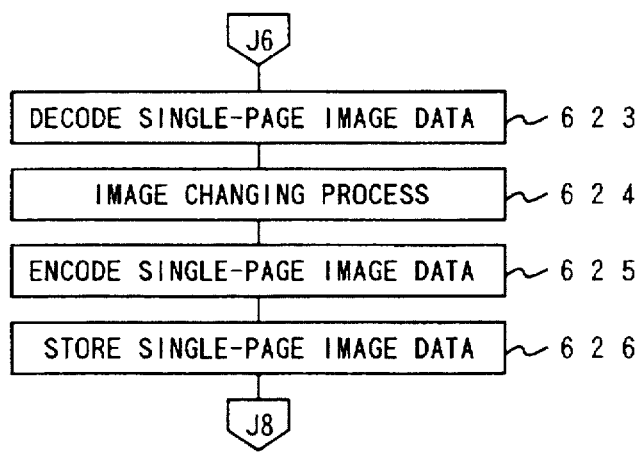

If it is determined, in step 608, that an image changing process is designated, the routine proceeds to step 623 shown in FIG. 15B. In step 623, the image data corresponding to the whole page is decoded so as to restore the raw image data. The raw image data is applied with the designated image changing process in step 624. Then, the processed image data corresponding to the whole page is once again encoded by the MMR method in step 625, and then the MMR image data is stored in the communication buffer in step 626. Thereafter, the routine proceeds to step 611 so as to transmit the image data in the transmission buffer.

Figure 15C:
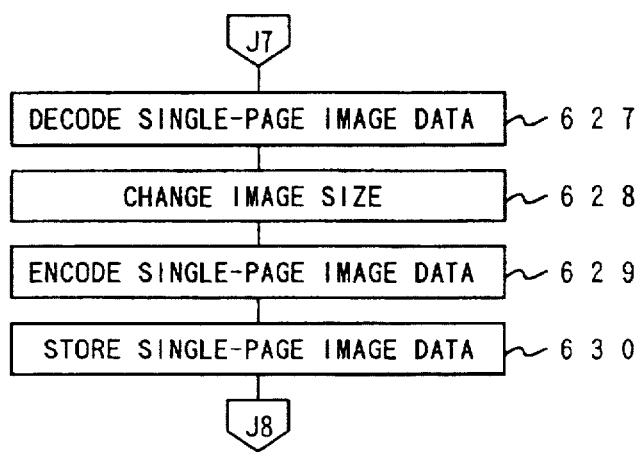

Additionally if the determination of step 607 is negative, the routine proceeds to step 627 shown in FIG. 15C. In step 627, the image data corresponding to the whole page is decoded so as to restore the raw image data. The raw image data is applied, in step 628, with a predetermined process such as an image scale changing process so that the raw image data can be handled by the remote terminal. Then, the processed image data corresponding to the whole page is once again encoded by the MMR method in step 629, and then the MMR image data is stored in the communication buffer in step 630. Thereafter, the routine proceeds to step 611 so as to transmit the image data in the transmission buffer.

Figure 16:
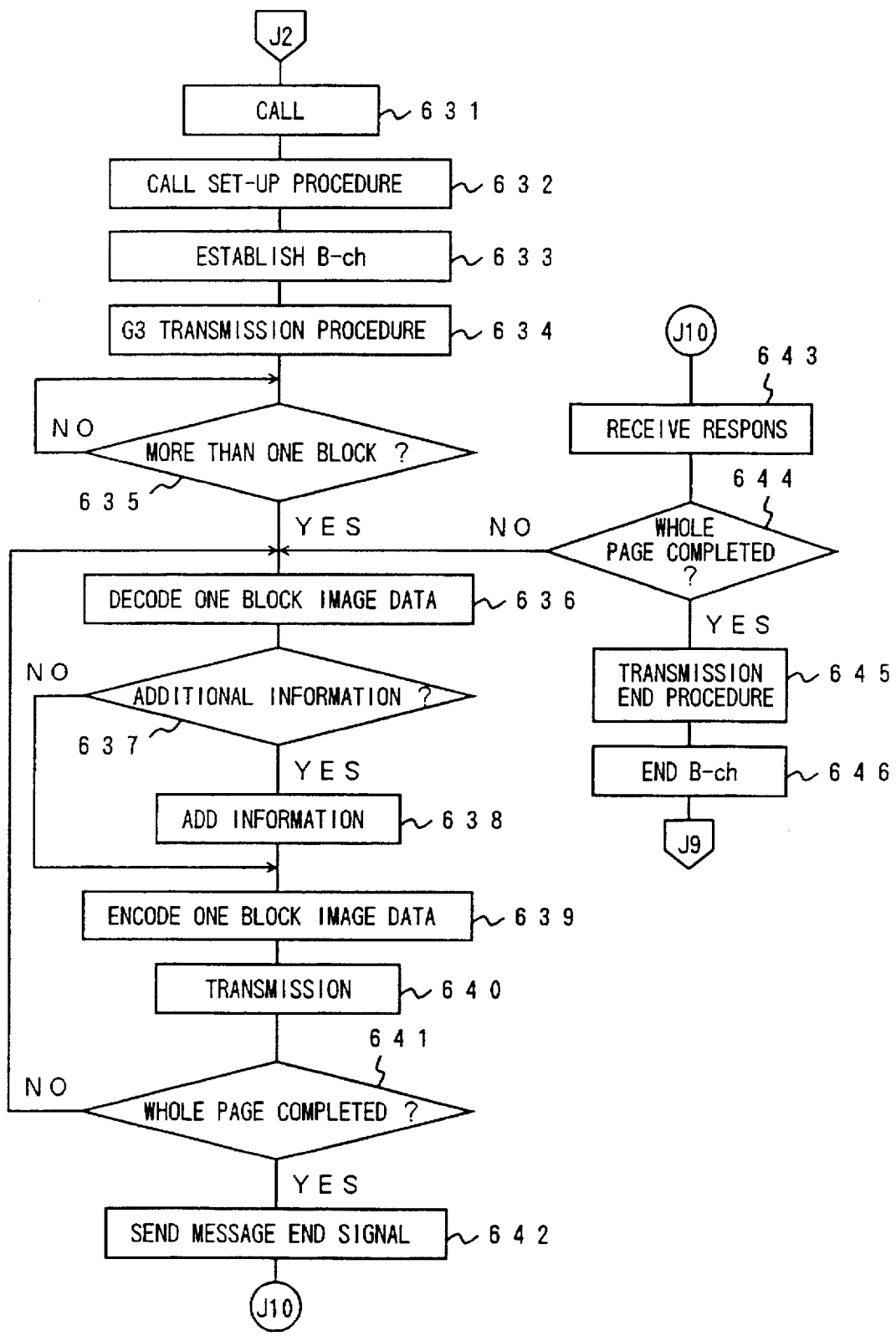

Further, if it is determined that the G4 facsimile communication mode is not set, that is, if the G3 facsimile communication mode is set, the routine proceeds to step 631 shown in FIG. 16. In step 631, the designated terminal is called. And then a predetermined call procedure is performed in step 632. Thereby, the predetermined information channel (B-ch) is established in step 633. A predetermined G3 facsimile communication procedure is performed, in step 634, for transmitting image data via the established channel.

It is then determined, in step 635, whether or not image data corresponding to more than one block is stored in the image storing device 10. If it is determined that the image data corresponding to more than one block is not stored, step 635 is repeated until the image data corresponding to more than one block is stored.

On the other hand, if it is determined, in step 635, that the image data corresponding to more than one block is stored in the image storing device 10, the routine proceeds to step 636. In step 636, the image data corresponding to one block (single block image data) is read from the image storing device 10, and the read image data is decoded. It is then determined in step 637, whether or not additional information, such as TTI data (transmitting terminal identification information) is to be added to the decoded data. If the determination of step 637 is affirmative, the routine proceeds to step 638 so as to add the additional information to the encoded single-block image data. Then the routine proceeds to step 639. On the other hand, if it is determined, in step 637 that there is not additional information to be added to the single block image data, the routine directly proceeds to step 639. In step 639 the single-block image data is encoded according to a designated method such as an MR method or an MH method. The encoded image data is transmitted to the remote terminal in step 640. The single-block image data which has already been transmitted to the remote terminal is deleted from the image storing device 10.

It is then determined, in step 641, whether or not the image data corresponding to the whole page has been transmitted. If it is determined that the image data corresponding to the whole page has not been transmitted yet, the routine returns to step 636 so as to transmit the image data corresponding to the next block. If it is determined that the image data corresponding to the whole page has been transmitted, the routine proceeds to step 642. In step 642, a predetermined message end signal is transmitted to the remote terminal, and a response signal is received from the remote terminal in step 643.

It is then determined, in step 644, whether or not the image data corresponding to the whole page has been transmitted. If it is determined that the image data corresponding to the whole page has not been transferred yet, the routine returns to step 636 so as to transmit the image data corresponding to the next page. If it is determined that the image data corresponding to the whole page has been transmitted, the routine proceeds to step 645. In step 645, a predetermined end procedure is performed according to the G3 facsimile communication mode. Then the information channel (B-ch) is released in step 646, and the routine proceeds to step 618 shown in FIG. 14 so as to disconnect the communication line.

It should be noted that when the determination of step 641 is negative, the routine may return to step 635 so as to determine whether or not the image data corresponding to more than one block is stored so that a synchronization is acquired with the image storing operation.

Figure 17:
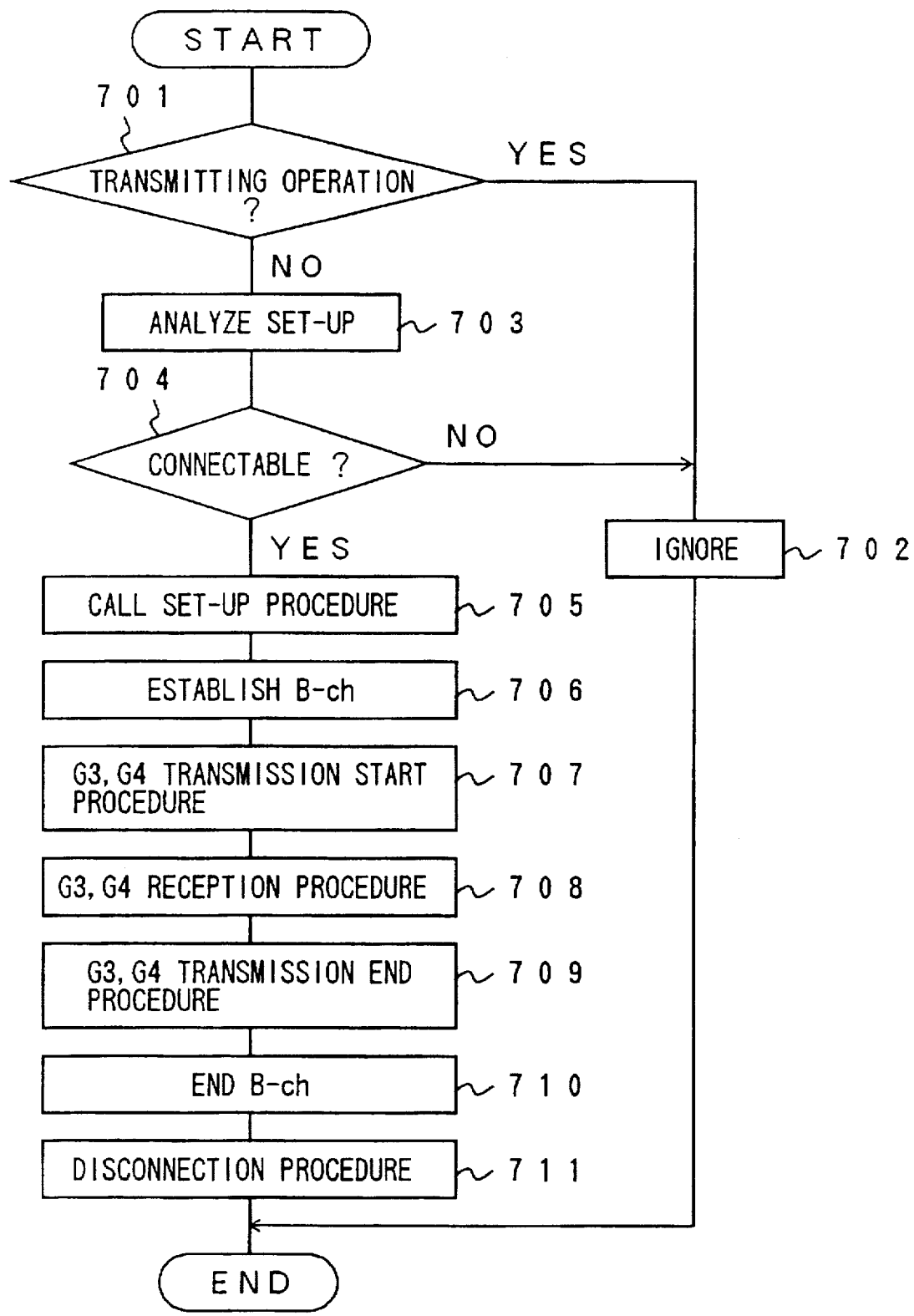
FIG. 17 is a flowchart of an operation performed when image data is received from a remote terminal.

FIG. 17 is a flowchart of an operation performed when image data is received from a remote terminal. When the local terminal receives a call set-up message SETUP from a remote terminal, it is determined, in step 701, whether or not the parallel storing and transmitting operation is being performed. If it is determined that the parallel storing and transmitting operation is being performed, the routine proceeds to step 702. In step 702, the request for the call set-up at this time is ignored, and the routine is ended.

If it is determined in step 701, that the parallel storing and transmitting operation is not being performed contents of the call set-up message SETUP are analyzed in step 703. It is then determined in step 704, whether or not the local terminal can be connected to the remote terminal sending the call set-up message SETUP. If the determination of step 704 is negative, the routine proceeds to step 702 so as to ignore the call.

On the other hand, if the determination of step 704 is affirmative, a predetermined call set-up procedure is performed in step 705. Then, the information channel (B-ch) is established, in step 706 between the local terminal and the remote terminal. In step 707; the G3 or G4 facsimile communication procedure is performed so as to prepare for receiving the image data from the remote terminal in step 708. When the reception of the image data from the remote terminal is completed a predetermined end procedure is performed, in step 709, according to the G3 or G4 facsimile communication mode. Thereafter, in step 710, the communication through the information channel (B-ch) is ended, and a predetermined disconnection procedure is performed in step 711. Then, the routine is ended According to the above-mentioned invention, even though the image memory is shared for the transmitting operation and the receiving operation, the transmitting operation and the receiving operation are not performed at the same time. That is, the image storing device 10 is exclusively used for one of the transmitting operation and the receiving operation when the one of the transmitting operation and the receiving operation is being performed. Thus, an available memory capacity remaining in the image storing device 10, when one of the transmitting operation and the receiving operation is performed, is not influenced by the other one of the transmitting operation and the receiving operation. Thus, the transmitting operation and the receiving operation are not interrupted due to an insufficient memory capacity of the image storing device 10, which condition may occur when the transmitting operation and the receiving operation are performed at the same time. As a result, when the image storing device 10 has a sufficient empty area, the parallel storing and transmitting operation can be properly performed.

Additionally, when the parallel storing and transmitting operation is performed, the image data is transmitted after the image data corresponding to one page is stored in the image storing device 10. Accordingly, the presence of the raw image data in the single-page image data can be determined before the transmission of the image data is started. Thus, the image data transmitting operation such as the data transmission according to the G3 facsimile communication mode, in which the image data to be transmitted, is always decoded and encoded again before a transmission can be distinguished from the image data transmitting operation such as the data transmission according to the G4 facsimile communication mode, which mode does not require the decoding and reencoding of the image data stored in the image storing device 10.

In the above-mentioned embodiment, it is determined in step 608, whether or not an image changing process is designated. The designated image changing process is applied to the image data stored in the image storing device 10 in accordance with the result of the determination. Such an image changing process is performed after the image data stored in the image storing device 10 is decoded and expanded to the raw image data. The encoding and expanding of the image data in the image storing device 10 is required for the following cases.

1) The single-page image data stored in the image storing device 10 contains the raw image data.

2) The encoding and compressing mode, such as the MMR mode, the MR mode or the MH mode, is different between a sending terminal and a receiving terminal.

3) The image size of the sending terminal is different from the image size of the receiving terminal. The image size is defined by, for example, a line density.

4) The length unit of the resolution of the image data is different between the sending terminal and the receiving terminal. For example, the image data of the sending terminal uses the inch system, and the image data of the receiving terminal uses the millimeter unit.

5) The TTI information (transmitter terminal identification information) is to be added, or the display information of the calling number is to be added to the image data to be transmitted.

There may be a case in which further information other than the information discussed above may be added to the image information other than the information listed above. For example, the image changing process must be applied according to a type of the facsimile apparatus. The present invention may be applied to such a case.

The present invention is not limited to the specifically disclosed embodiments, and variations and modifications may be made without departing from the scope of the present invention.

What is claimed is:

1. An image formation communication apparatus for communicating with a plurality of remote image information communication apparatuses via a communication network, said image information communication apparatus comprising:

image storing means for storing transmission image data in an image memory, said transmission image data being produced by encoding and compressing raw image data obtained by reading an original document of which image data is to be transmitted to one of said remote image information communication apparatuses;

parallel storing and transmitting means for concurrently performing a storing operation of said transmission image data and a transmitting operation for transmitting said transmission image data stored in said image memory; and control means for controlling said transmitting operation of said parallel storing and transmitting means and a receiving operation for receiving image data from one of said remote image information communication apparatuses and for storing said received image data in said image memory so that said receiving operation is prohibited after said parallel storing and transmitting means has initiated the storing operation of said transmission image data, and the initiation of the storing operation of said transmission image data by said parallel storing and transmitting means is prohibited when said receiving operation is being performed.

2. An image information communication apparatus for communicating with a plurality of remote image information communication apparatuses via a communication network, said image information communication apparatus being operated in either one of a G4 facsimile communication mode and a G3 facsimile communication mode, said image information communication apparatus comprising:

switch means for switching an operation of said image information communication apparatus to one of the G4 facsimile communication mode and the G3 facsimile communication mode;

image storing means for storing transmission image data in an image memory, said transmission image data being produced by encoding and compressing raw image data obtained by reading an original document of which image data is to be transmitted to one of said remote image information communication apparatuses, said transmission image data being stored by each set of single-page image data corresponding to a single page of said original document, said each set of single page image data being divided into a plurality of sets of block data;

first transmitting means for transmitting said transmission image data by each of said sets of block data when the operation of said image information communication apparatus is switched to the G3 facsimile communication mode; and second transmitting means for transmitting said transmission image data by each set of said single-page image data only when the operation of said image data communication apparatus is switched to the G4 facsimile communication mode.

3. The image information communication apparatus as claimed in claim 2, wherein said second transmitting means comprises determining means for determining whether or not said transmission image data is to be decoded and expanded to said raw image data so as to change said transmission image data in said image memory before transmitting said transmission image data to one of said remote image information communication apparatuses.

4. The image information communication apparatus as claimed in claim 3, wherein said determining means determines that said transmission image data is to be encoded and expanded when said transmission image data contains said raw image data.

5. The image information communication apparatus as claimed in claim 3, wherein said determining means determines that said transmission image data is to be decoded and expanded when an encoding and compressing mode of said image information communication apparatus is different from an encoding and compressing mode of one of said remote image information communication apparatuses being connected.

6. The image information communication apparatus as claimed in claim 3, wherein said determining means determines that said transmission image data is to be decoded and expanded when a first image size of said image information communication apparatus is different from a second image size of one of said remote image information communication apparatuses being connected.

7. The image information communication apparatus as claimed in claim 3, wherein said determining means determines that said transmission image data is to be decoded and expanded when a first resolution of said image information communication apparatus is different from a second resolution of one of said remote image information communication apparatuses being connected.

8. The image information communication apparatus as claimed in claim 7, wherein said determining means determines that said transmission image data is to be decoded and expanded when said first resolution and said second resolution are different in a line density.

9. The image information communication apparatus as claimed in claim 7, wherein said determining means determines that said transmission image data is to be decoded and expanded when said first resolution and said second resolution are different in a length unit.

10. The image information communication apparatus as claimed in claim 3, wherein said determining means determines that said transmission image data is to be decoded and expanded when additional information is to be added to said transmission image data before said transmission image data is transmitted.

11. The image information communication apparatus as claimed in claim 10, wherein said additional information is transmitter terminal identification information.

12. The image information communication apparatus as claimed in claim 10, wherein said additional information is display information of a calling number of one of said remote image information communication apparatuses being connected.

13. The image information communication apparatus as claimed in claim 2, wherein said second transmitting means comprises a decoding and expanding unit for decoding and expanding said transmission image data to said raw image data when said determining means determines that said transmission image data is to be encoded and compressed, said second transmitting means further comprising an encoding and compressing unit for encoding and compressing said raw image data produced by said decoding and expanding unit after a change is made to said raw image data produced by said decoding and expanding unit.

14. The image information communication apparatus as claimed in claim 2, further comprising:

parallel storing and transmitting means for concurrently performing a storing operation of said transmission image data and a transmitting operation for transmitting said transmission image data stored in said image memory; and control means for controlling said transmitting operation of said parallel storing and transmitting means and a receiving operation for receiving image data from one of said remote image information communication apparatuses so that said receiving operation is prohibited when said transmitting operation is being performed and said transmitting operation is prohibited when said receiving operation is being performed.

* * * * *